Patented July 11, 1950

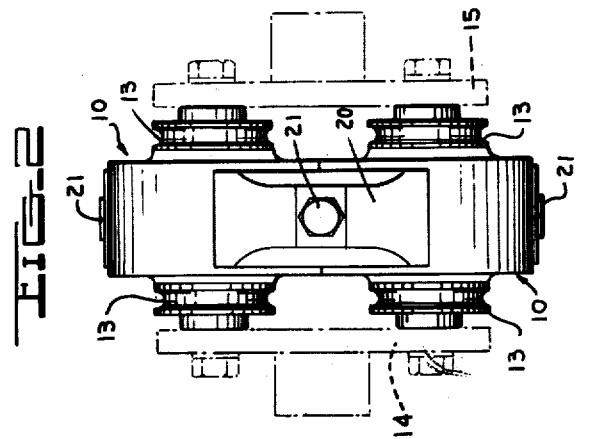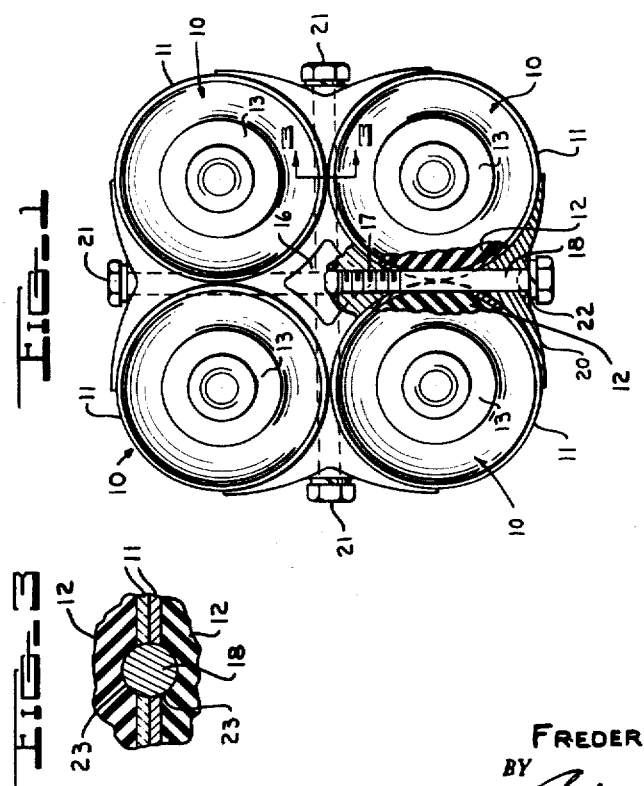

2,515,000

UNITED STATES PATENT OFFICE 2,515,000

UNIVERSAL JOINT

Frederick M. Guy, Detroit, Mich., assignor to Guy & Murton, Inc., Detroit, Mich., a corporation of Michigan Application October 9, 1946, Serial No. 702,238

4 Claims. (Cl. 64—11)

The present invention relates to a universal joint or flexible coupling and more particularly to such a joint or coupling in which resilient elements are interposed between the driving and driven shaft to provide a resilient driving connection.

The present invention is an improvement upon the universal joint construction shown in my issued Patents Nos. 1,978,939, dated October 30, 1934, and 2,195,647, dated April 2, 1940.

An object of the present invention is to provide an improved universal joint or flexible coupling in which resilient bushings are interposed between the driving and driven shaft connection to provide for the parallel, angular and longitudinal misalignments of the connected shaft, and to provide a yielding but positive connection between the shafts, and in which irregularities in the transmitted torque loads are cushioned to provide a smooth flow of power through the joint or coupling with a minimum amount of power loss.

It is a further object of the present invention to provide an improved universal joint or flexible coupling in which all metal to metal contacts between the driving and driven shaft connections are eliminated, thus providing a joint or coupling which is quiet in its operation, is not affected by dirt or grit, and which does not require lubrication.

It is a further object of the present invention to provide an improved universal joint or flexible coupling in which all parts are centralized in a unitary carrier to provide a joint or coupling of balanced construction which runs true without friction or backlash during its operation, the design of the carrier and the resilient drive members mounted therein permitting the economical manufacture of the joint or coupling by mass production methods within rather broad tolerance limits.

It is a further object of the present invention to provide an improved universal joint or flexible coupling in which the construction of the carrier permits the ready installation or removal of the joint or coupling between the driving and driven shafts and in which, because of its design and construction, the size and weight of the carrier member is held to a minimum for the load capacity of the joint or coupling.

It is a further object of the present invention to provide a novel connector for a plurality of separate resilient bushings to form a unitary central member in which the resilient bushings are held in predetermined alignment thus to provide a universal joint or flexible coupling having a relatively high capacity in respect to its relatively small diameter.

Other objects of this invention will appear in the following description and appended claims, reference being had to the accompanying drawings forming a part of this specification wherein like reference characters designate corresponding parts in the several views.

In the drawings:

Fig. 1 is a plan view, partially in section, of the central carrier plate and resilient bushings of a torque transmitting coupling embodying the present invention.

Fig. 2 is a side elevation of a torque transmitting coupling of the present invention connected to driving and driven shaft flanges shown in dotted line.

Fig. 3 is a section of that portion of the coupling indicated by the line 3—3 looking in the direction of the arrows, Fig. 1.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

A resilient torque coupling of the present invention includes a plurality of resilient bushings indicated generally by the numeral 10. Each of the bushings comprises a rigid circumferential shell portion 11, preferably formed of steel or the like, and a body of resilient material 12, preferably formed of natural or synthetic rubber, or a blend thereof, which is secured to the inner circumference of the shell 11. A connector stud 13 is mounted in the central portion of the resilient bushing 10 and is secured to the body of resilient material 12. The plurality of resilient bushings 10 are arranged in a symmetrical cluster with adjacent circumferential edge portions in contact. As here shown, four such bushings are provided but it is to be understood that any other desired numerical combination of bushings may be similarly employed by suitable changes in the shape and size of the connector members, as will be hereinafter more fully described.

A driving member 14 and a driven member 15 shown in the dotted line portions of Fig. 2 are connected on opposite sides of the resilient coupling member to the centrally located studs 13 of opposed pairs of the resilient bushings 10.

The resilient bushings 10 are mounted in a carrier assembly which comprises a central member 16, the sides of which are curved to conform to the curvature of the shells 11 of the resilient members 10. The central member 16 is drilled and tapped with a stud receiving opening 17 at each of the portions which extend between adjacent resilient bushings 10.

A stud 18 has a threaded end portion adapted to extend into and be received by each of the tapped and threaded openings 17 in the central member 16. A plurality of wedge members 20 are provided, each of which has an apex portion extending into the space between an adjacent pair of resilient bushings 10 and each of which has curved side portions leading away from said apex portion, the curvature of the side portions corresponding to the curvature of the shell portions 11 of the resilient bushings 10. The wedge members 20 are drilled to provide an opening to receive the shank of the stud members 18.

A lock washer 22 is disposed between the enlarged head portion 21 on the stud 18 and the surface of the wedge member 20.

The circumferential shell portion is drilled as shown in Fig. 3 to provide the cutout portion 23 which mates with a similar cutout portion 23 in the shell 11 of an adjacent resilient bushing 10. The stud 18 extends through the wedge member 20 and through the cutout portions 23 in the shells 11 of adjacent resilient members 10 and has a threaded engagement with the threaded stud-receiving recesses 17 in the central member 16. It will be seen that by this construction the resilient bushings 10 are securely clamped between the side portions of the wedge members 20 and the curved side portions of the central member 16. The extension of the shank of the stud 18 through the drilled openings 23 provided in the shells 11 of the adjacent resilient bushings 10 prevents endwise displacement of the resilient bushings 10 and thus imparts additional stability to the assembled carrier.

It will be seen that the present construction thus provides for a positive locating of the plurality of resilient bushings 10 in a predetermined symmetrical pattern about a central member. It also will be seen that the weight of the assembly is substantially reduced over the weight of conventional assemblies of such bushings, in which metal stampings are utilized to provide pockets in a unitary plate member for holding the resilient bushings. In instances where the coupling is to be used at high speeds of rotation or in instances where the intermittent stopping and starting of the connected members requires a lightweight coupling so as to cut down the inertia between the connected parts, the center member 16 and the wedge members 20 may be formed of a lightweight metal or alloy, such, for example, as an aluminum alloy, or the like or similar materials. The construction herein disclosed provides a strong and rigid connection of the resilient members 10 in a manner which reduces both the weight and the cost of the assembly. Likewise the overall diameter of the assembled units is substantially less than the diameter of conventional types of units adapted to carry the same loads and utilizing the same number of resilient bushings.

In the construction here shown, it is contemplated that the driving and driven members will be connected to opposed centers of the driving stud members 18 on opposite sides of the assembly. It is to be understood, however, that if desired, all of the stud members 18 may extend on the same side of the plate for connection to one of the driving or driven members, the other member being suitably connected by any desired type of flange or bracket connected with the stud members 18. All such changes are within the scope of the present invention.

In a preferred embodiment of the present invention, the resilient bushings 10 are molded and then preferably subjected to a swedging or similar operation to reduce the diameter of the outer shell 11. In this manner, the resilient material in the bushings 10 may be pre-loaded as desired to provide the required resistance to movement of the connector studs 13 relative to the shells 11.

It will be apparent from the foregoing that the resilient bushings 10 are mechanically locked against endwise displacement from the carrier assembly, since each of the studs 18 extend through the openings in the shells 11 of adjacent bushings 10. Thus each bushing 10 is held in place by two of the studs 18 which engage the shell 11 at two points spaced 90° from each other. The studs 18 are selected for strengths in excess of the end-thrust loads to which the joint assembly is to be subjected and hence endwise displacement of the bushings 10 does not occur during any intended operation of the joint within its normal load carrying capacity.

I claim:

1. A resilient torque transmitting coupling comprising a plurality of resilient bushings each having a rigid circumferential shell and a centrally disposed connector member, means for mounting said bushings in a symmetrical cluster and comprising a spacer located at the center of the cluster and having curved edge portions for receiving the adjacent portions of the circumferential shells of the resilient bushings in said cluster and clamping means co-acting with said spacer and bearing on portions of the circumferential shells of said resilient bushings at points removed from said spacer to draw said resilient bushings into position relative to said spacer, and including a plurality of wedge members each having an apex portion extending into the space between the circumferential shells of an adjacent pair of said resilient bushings and having extended curved side portions adapted to engage with a portion of the curved shells of said resilient bushings and adjustable means extending through the apex portion of each of said wedge members and connected to the said spacer for drawing said wedge members inwardly of the cluster and toward the spacer.

2. A resilient torque transmitting coupling comprising a plurality of resilient bushings each having a rigid circumferential shell and a centrally disposed connector member, means for mounting said bushings in a symmetrical cluster and comprising a spacer located at the center of the cluster and having curved edge portions for receiving adjacent portions of the circumferential shells of the resilient bushings in said cluster and clamping means extending through a portion of the shells of a pair of adjacent bushings and coacting with said spacer and bearing on portions of the circumferential shells of said resilient bushings at points removed from said spacer to draw said resilient bushings into position relative to said spacer, said clamping means including a plurality of wedge members each having an apex portion extending into the space between the circumferential shells of each adjacent pair of said resilient bushings and having extended curved side portions adapted to engage with a portion of the curved shells of the adjacent pair of resilient bushings and adjustable means extending through the apex portion of each of said wedge members and connected to the said spacer for drawing said wedge members inwardly of the cluster and toward the spacer.

3. A resilient torque transmitting coupling comprising a plurality of resilient bushings each having a rigid circumferential shell and a centrally disposed connector member, means for mounting said bushings in a symmetrical cluster and comprising a spacer located at the center of the cluster and having curved edge portions for receiving the adjacent portions of the circumferential shells of the resilient bushings in said cluster and clamping means co-acting with said spacer and bearing on portions of the circumferential shells of said resilient bushings at points removed from said spacer to draw said resilient bushings into position relative to said spacer, said clamping means including a plurality of wedge members, each having an apex portion extending into the space between the circumferential shells of each adjacent pair of said resilient bushings and having extended curved side portions adapted to engage with a portion of the curved shells of an adjacent pair of resilient bushings, and a stud extending through the said apex portion of each of said wedge members and having a threaded engagement with said spacer for thereby drawing said wedge members inwardly toward said spacer and exerting a clamping force on the shells of said resilient bushings.

4. A resilient torque transmitting coupling comprising a plurality of resilient bushings each having a rigid circumferential shell and a centrally disposed connector member, means for mounting said bushings in a symmetrical cluster and comprising a spacer located at the center of the cluster and having curved edge portions for receiving adjacent portions of each pair of circumferential shells of the resilient bushings in said cluster and clamping means extending through a portion of the shells of a pair of adjacent bushings and co-acting with said spacer and bearing on portions of the circumferential shells of said resilient bushings at points removed from said spacer to draw said resilient bushings into position relative to said spacer, said clamping means including a plurality of wedge members, each having an apex portion extending into the space between the circumferential shell of an adjacent pair of said resilient bushings and having extended curved side portions adapted to engage with a portion of the curved shells of said adjacent pair of resilient bushings, and a stud extending through the circumferential shells of each adjacent pair of said resilient bushings and through the apex of the wedge members disposed between said bushing, said stud having a threaded end adapted for engagement with said spacer for thereby drawing said wedge members inwardly toward said spacer to exert a clamping force on the shells of said resilient bushings between said wedge members and said spacer.

FREDERICK M. GUY.

REFERENCES CITED

The following references are of record in the file of this patent:

UNITED STATES PATENTS

| Number | Name | Date |
|---|---|---|
| 2,153,466 | Hardy | Apr. 4, 1939 |